(No Model.) 5 Sheets—Sheet 1.
C. E. CLEVELAND.
BAND SAW MILL.
No. 451,106. Patented Apr. 28, 1891.
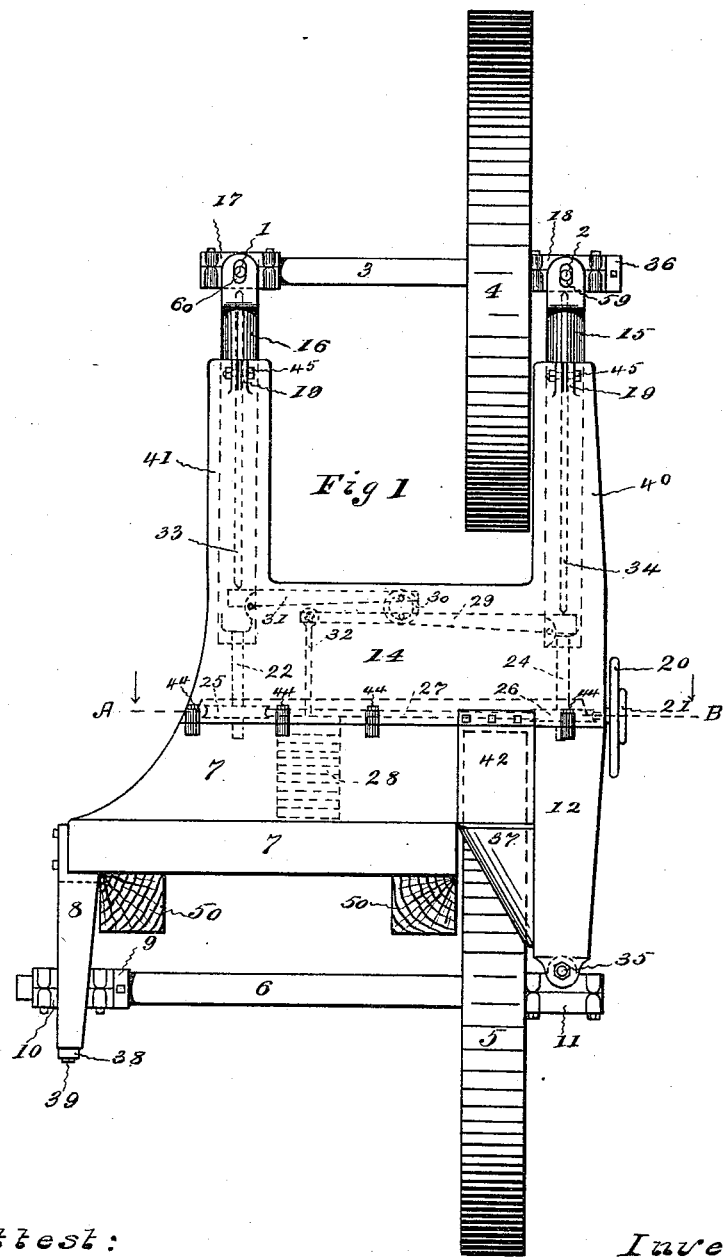
Attest:
Geo Giddings
C. H. DeGroat
Inventor:
Chas E. Cleveland

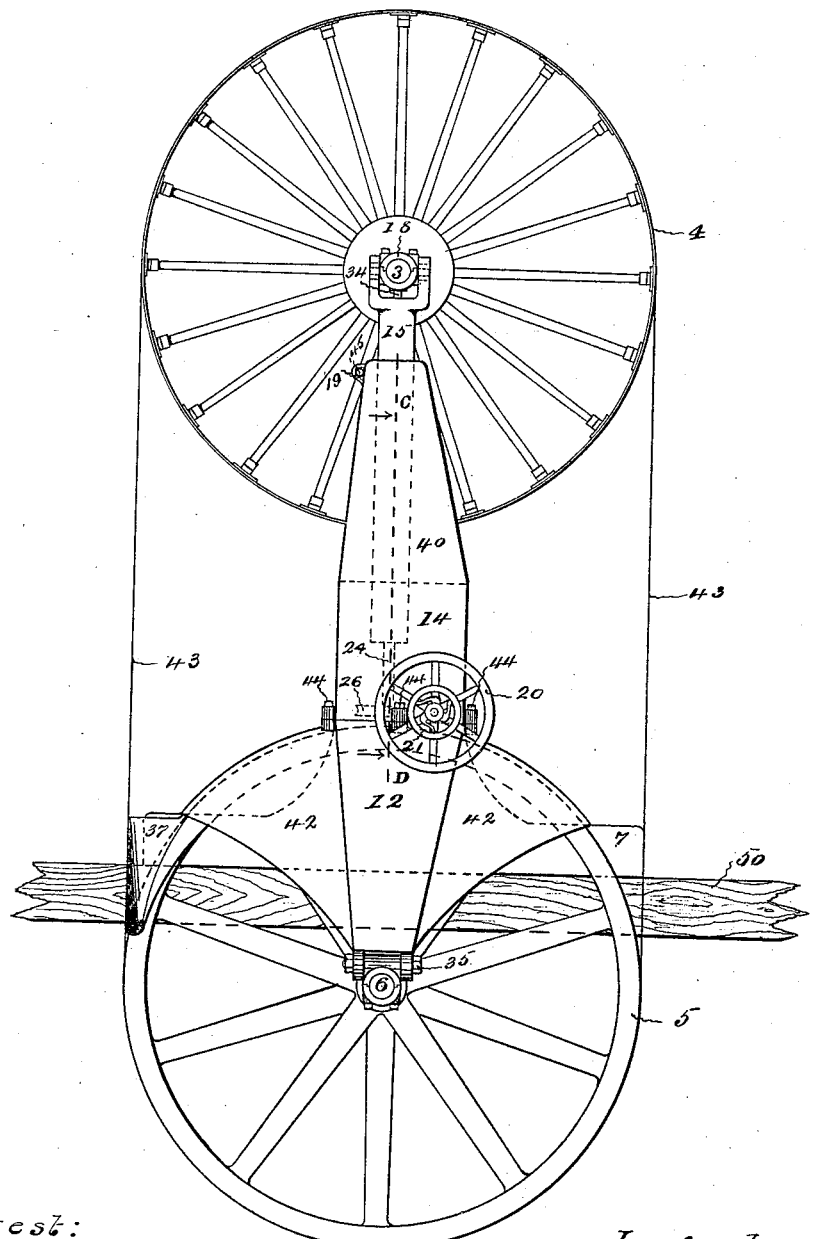

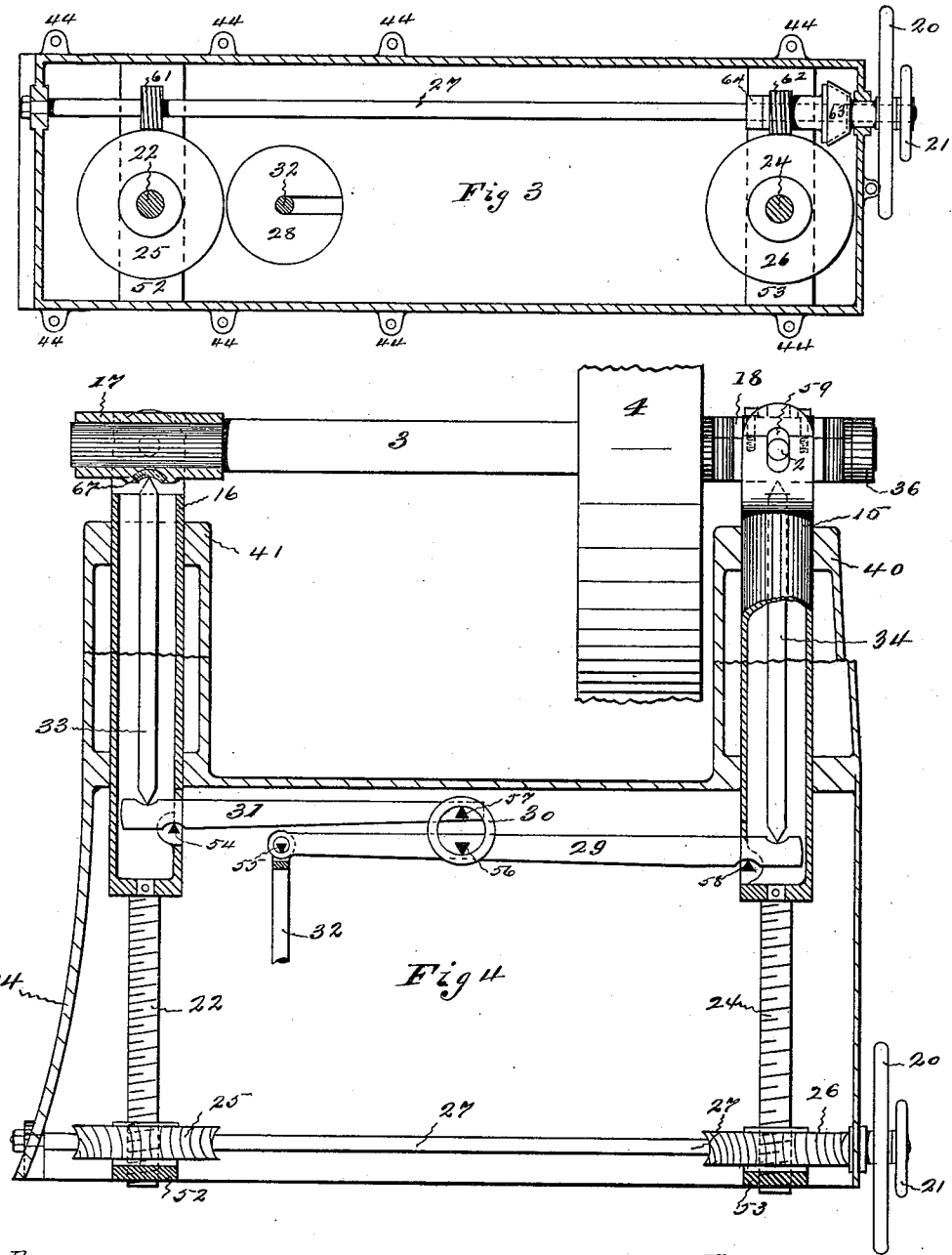

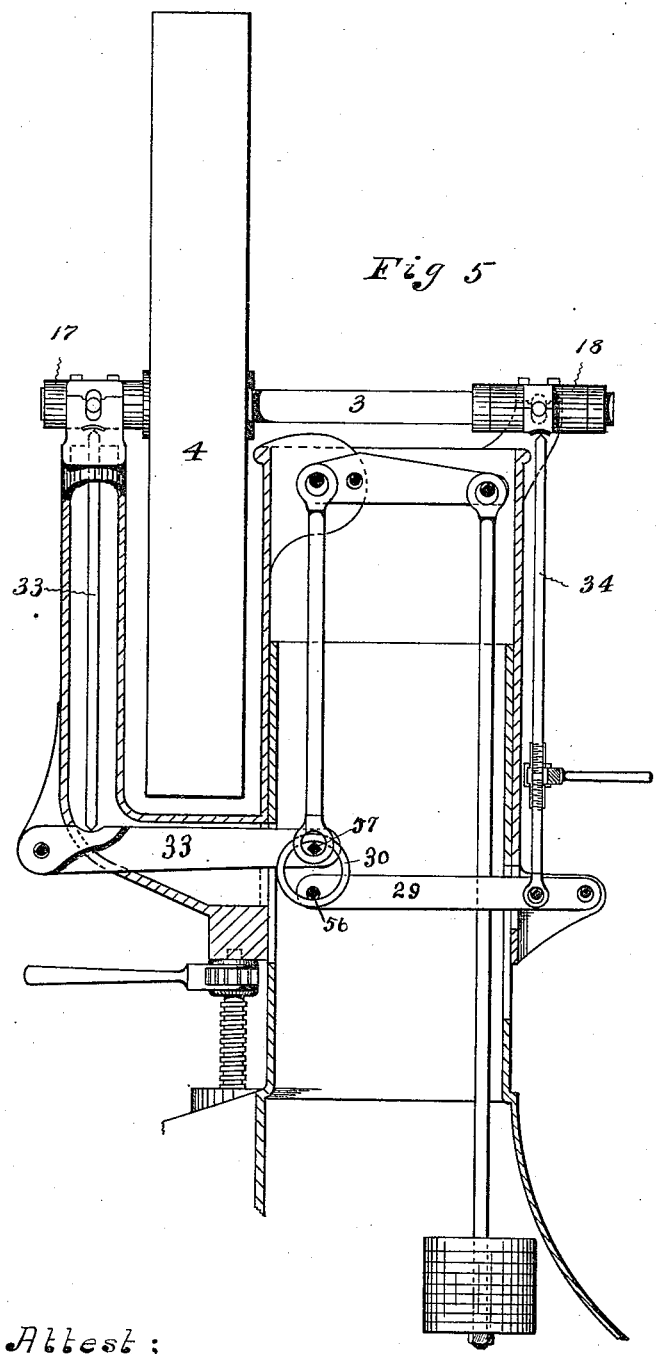

(No Model.)  5 Sheets—Sheet 5.
C. E. CLEVELAND.
BAND SAW MILL.
No. 451,106.  Patented Apr. 28, 1891.
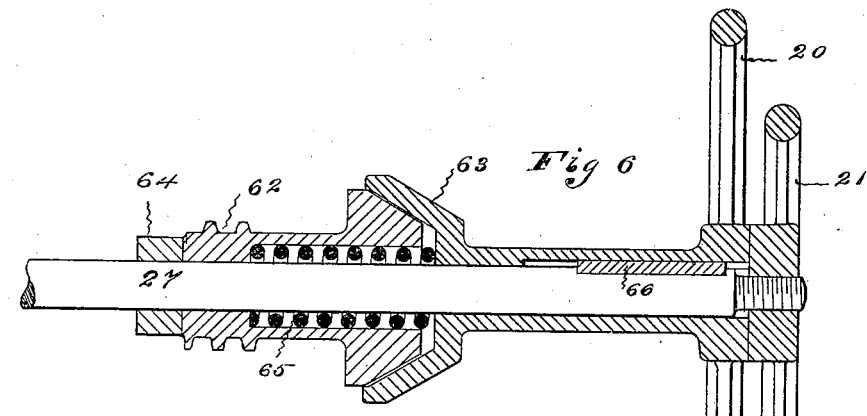
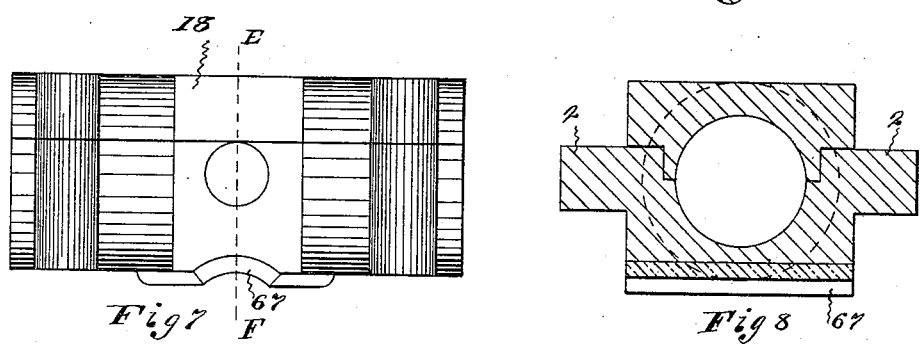
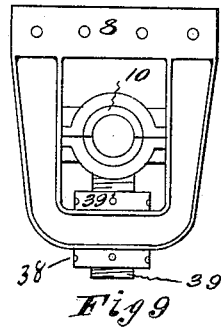
Attest:
C. H. De Groat
Geo Giddings
Inventor:
Chas E. Cleveland

UNITED STATES PATENT OFFICE.

CHARLES E. CLEVELAND, OF FOND DU LAC, WISCONSIN.

BAND-SAW MILL.

SPECIFICATION forming part of Letters Patent No. 451,106, dated April 28, 1891.

Application filed October 30, 1890. Serial No. 369,764. (No model.)

*To all whom it may concern:*

Be it known that I, CHARLES E. CLEVELAND, a resident of Fond du Lac, in the county of Fond du Lac and State of Wisconsin, have invented certain new and useful Improvements in Band-Saw Mills; and I do hereby declare the following to be a full, clear, and exact description of the invention, such as will enable others skilled in the art to which it pertains to make and use the same.

The object of the invention is to simplify the construction of band-saw mills and increase their efficiency. It is of prime importance that the saw-pulleys be so adjusted as to hold the saw taut or suitably strained; also that the pulleys be properly aligned in a vertical plane, and, further, that the distance between the axes of the saw band-pulleys be made automatically variable within small limits to provide for irregularities of stress and for a proper and safe distribution of the same. As a velocity of from eight to ten thousand feet per minute is contemplated, it is manifest that the main part of the machine must be solidly supported and that the automatically-operating parts must be as sensitive and speedy in operation as possible.

The invention contemplates improvements in the saw-wheel aligning and adjusting mechanism for straining the saw and for automatically adjusting the strain, in the frame and in certain details; and the invention consists in the constructions which will be hereinafter described, and particularly pointed out.

In the accompanying drawings, Figure 1 is a side elevation of the saw frame and pulleys, floor-timbers being shown in section, and the driving-pulley, log-carriage, and other parts omitted. Fig. 2 is a front elevation of the same. Fig. 3 is a horizontal section on line A B of Fig. 1. Fig. 4 is a broken vertical section on line C D of Fig. 2. Fig. 5 is a vertical section of a modification of the saw supporting and straining mechanism. Fig. 6 is a section of the shaft for adjusting the upper saw-pulley and of a clutch thereon. Fig. 7 is a side elevation of a journal-box, and Fig. 8 is a transverse section on line E F of Fig. 7. Fig. 9 is an elevation of a journal-box and hanger for the shaft of the lower saw-pulley.

The base of the saw-supporting frame is denoted by 7. Upon this is secured by ears and bolts 44 a frame 14, having a U form, as represented. The base and frame, including its uprights 40 and 41, are made hollow. Said base rests upon floor-timbers 50, and at its rear is provided with a hanger 8, which supports one end of the shaft 6, upon which is the driving-pulley (not shown) and the lower saw-pulley 5. The front end of the shaft is supported in a bracket or hanger 12, which in the present instance is bolted to frame 14.

10 and 11 are the journal-boxes.

39 is an adjusting-screw for suitably adjusting the box 10, and 38 and 39' are jam-nuts.

35 is a bolt passing through two pendent ears attached to hanger 12 and also through an ear formed on the box 11, whereby the latter is supported.

5 denotes the lower band-saw pulley, made of iron or steel and heavy to secure proper momentum and steadiness of motion.

42 are aprons cast on or otherwise secured to hanger 12, one on each side, to cover the wheel and prevent its vibration.

37 is a "doctor" or scraper to clean the saw 43.

4 is the upper saw-pulley, and is made of metal, but as light as is consistent with due strength. It is made fast on shaft 3, supported in journal-boxes 17 and 18. These boxes are provided with studs 1 and 2, which may be circular or of oval form in cross-section, and which are entered in slots 59 and 60, formed in the upward extension of the tubular posts 15 and 16, respectively. These extensions form forks, between the limbs of which the boxes are supported, their studs extending laterally through the slots 59 and 60, as stated. The posts 15 and 16 are sustained by the screws 22 and 24, which have a screw-thread connection with the hubs of wheels 25 and 26, supported upon the bars 52 and 53, which latter constitute a part of frame 7.

25 and 26 are worm-gears threaded upon the said screws and adapted to be turned by the shaft 27, journaled in the frame and provided with worms 61 and 62, with operating hand-wheels 20 and 21, and with a clutch 63. These worms engage the gears 25 and 26 and are adapted to rotate them, and thus turn the screws 22 and 24. The worm 62 is loosely placed upon shaft 27, and is clutched or clamped thereon by the cup-shaped device 63, which is cast solid with a sleeve, to which the hand-wheel 20 is secured and of which it forms a part, which sleeve slides upon the shaft 27, being keyed thereto by the feather 66.

64 is a stop, and 65 is a spring. The latter tends to relieve the worm 62 of the clutch 63 whenever hand-wheel 21 is unscrewed, so as to move away from wheel 20. At such times the turning of shaft 27 will not rotate the worm 62.

The mechanism just described is for moving up or down the tubular posts 15 and 16. Said tubular posts are fitted to move up or down through the webs or projections formed on the interior of the uprights, and when suitably adjusted are clamped in the uprights 40 and 41 by means of screw-bolts 45 and 46, passing through ears or webs 19, formed one on each side of a narrow slot in the upper end of each upright.

The journal-boxes 17 and 18 are supported vertically upon the rods or bars 33 and 34, provided with hardened knife edges or points, which at top bear against suitable concave plates 67, made of hard metal, which plates may have a dovetail connection with the boxes, as indicated. The bars 33 and 34 extend down through the hollow posts and are supported upon the short arms of levers 31 and 29, respectively. These levers rest upon steel fulcrums 54 and 58 and extend out through slots in the posts.

30 is a coupling-ring, there being one on each side of the levers and embracing the lateral steel knife-edge studs 56 and 57, as shown.

32 is a rod for suspending the weight 28, and it is also provided with a knife-edge of steel bearing upon the inner surface of a ring attached to lever 29.

The operation of the above-described devices will next be described. The shaft 6 having been adjusted in horizontal plane and the saw placed on the pulleys, it is suitably strained by turning the shaft 27 by means of the wheel 20, the clamping device 63 being properly jammed upon the conical piece connected with the worm 62, so that both worm-gears are driven and the screws 22 and 24 turned to raise the hollow posts 15 and 16 and the boxes 17 and 18. The proper distance between the shafts 3 and 6 having thus been approximately secured, the upper shaft can be made parallel to the lower and the upper pulley exactly aligned with the lower by suitably manipulating the wheels 20 and 21, so as to properly raise or lower the screw 22 and the box 17 to bring the studs 1 and 2 nearly on a level, stud 1 being kept a little the highest to prevent the saw from being forced off the wheel. Preferably, when this straining and aligning has been effected, the studs or pins 1 and 2 will be at about the mid-height of the slots 59 and 60 in the arms or forks of the posts 15 and 16. These studs fit the slot laterally, but not vertically, and the journal boxes and shafts are therefore held firmly against any movement horizontally, while free to move vertically to the extent of the length of the slots. The posts 15 and 16 having been adjusted, as stated, they are locked in position by clamping upon them the upper part of the slitted uprights by means of the screws 45, whereby the tubular posts are rigidly held. This having been done, the shaft 3 and its bearings are supported vertically entirely upon the rods 33 and 34, whose lower ends are supported by the levers, substantially as shown, and in such manner that the weight 28 counterbalances the upper shaft and pulley and the force of the saw thereupon. The parts are nicely balanced upon sharp fulcrums of steel, the entire weight of the saw, upper pulley, and shaft being sustained upon the rods and levers. Of this load every element is constant except the stress or pull of the saw, which varies under different circumstances, and will cause the saw to work badly and produce "snaky" lumber and at times break, unless properly regulated. These variations are instantaneously and automatically counteracted by their effect upon the weighted levers. Excessive strains are expended by lifting the weight, and are thereby exhausted, and any slackness in the saw is neutralized by the descent of the weight. It will be noted that shaft 3 is supported upon the rods 33 and 34 solely, and that these have no duty to prevent lateral vibrations, that being effectually performed by the rigidly-held posts. These rods and their connected system of levers and counterbalancing-weight are much more sensitive and less subject to erratic action than in former constructions, wherein the supporting rods or tubes were made to slide in the posts and were depended upon to defend against lateral as well as vertical movements or vibrations. The said rigid posts being extended to the plane of the axis of the shaft and having direct bearings upon the sides of the studs or guiding-pins perform their duty of steadying the shaft lengthwise more effectually than movable or moving supports could do. Thus by my construction increased stability in one direction is secured conjointly with increased sensitiveness of adjustability in the other, as is desirable.

Neither the particular arrangement of levers nor the tubular adjustable posts are essential to this special improvement. These and other parts may be varied without departing from this feature of the improvement. Thus in Fig. 5 I have illustrated the application of a part of my improvement to another form of mill. In this it will be seen that the tubular adjustable supports are omitted and that the upper shaft and pulley are steadied lengthwise of the shaft by a rigid part of the frame, while the vertical supports and counterbalancing-lever system are entirely freed from any lateral duty. I do not wish to be limited in respect to this or any other feature of my invention to the precise forms illustrated, so long as substantially the same mechanical and operative principles are employed.

It may be further noted that by the present improvement the adjusting and straining mechanism is so arranged that it can be manipulated at the front of the saw. This is a practically important feature, as time is unnecessarily consumed by the necessity of the sawyer passing to the rear of the machine to reach the adjusting mechanism, the millhands meantime awaiting his movements. As arranged by the present improvement, the sawyer can handle the wheels 20 and 21 without leaving his post. It will also be observed that the studs 1 and 2, movable in the short slots, act as stops. The slots are made sufficiently long, so as not to interfere with the vertical vibrations of the pulley and shaft under ordinary conditions. Under extraordinary circumstances, however—as when the weight, or a spring, if such is substituted for the weight, is disconnected by accident—these stops serve an important purpose and prevent disaster to the mill by at once arresting and solidly supporting the shaft.

Having thus described my invention, what I desire to secure by Letters Patent is—

1. The combination of the saw, the pulleys and their shafts, the journal-boxes of the upper pulley-shaft, the rods bearing directly against said boxes and constituting their sole vertical support, and the counterbalancing weights and levers, substantially as set forth.

2. The combination of the saw, the pulleys and their shafts, the journal-boxes of the upper pulley-shaft provided with lateral studs, the rods bearing directly against said boxes and constituting their sole vertical support, the counterbalancing weights and levers, and the posts provided with arms having vertical oblong slots, the sides of which bear upon the studs projecting laterally from the boxes, substantially as set forth.

3. The combination of the saw, the pulleys and their shafts, the journal-boxes of the upper pulley-shaft provided with lateral studs, the rods bearing directly against said boxes and constituting their sole vertical support, the counterbalancing weights and levers, and the vertically-adjustable posts provided with arms having vertical oblong slots, the sides of which bear upon the studs projecting laterally from the boxes, substantially as set forth.

4. In a band-saw mill, the combination of the rods adapted to support vertically the upper band-saw shaft, with the screws, the worm gear-wheels fixed upon the screws, the shaft provided with worms, one of which is normally loose thereon, and the clutch adapted to lock said worm upon the shaft and provided with the hand-wheel and normally held out of engagement with the worm, substantially as set forth.

5. In a band-saw mill, the combination of the rods adapted to support vertically the upper band-saw shaft, with the screws, the worm gear-wheels fixed upon the screws, one of the worms being adapted to be thrown out of gear, and the clutch, substantially as set forth.

6. In a band-saw mill, the U-shaped frame having the hollow upright members 40 and 41, the adjustable posts 15 and 16, mechanism for adjusting said posts vertically, a clamping device for clamping the posts in the uprights, and the upper saw-shaft and its journal-boxes, said boxes having studs engaged on each side of the posts, substantially as set forth.

In testimony whereof I have signed this specification in the presence of two subscribing witnesses.

CHAS. E. CLEVELAND.

Witnesses:
  F. L. SHEPARD,
  W. M. MCDERMOTT.